United States Patent [19]

Kuwamoto et al.

[11] Patent Number: 5,657,182

[45] Date of Patent: Aug. 12, 1997

[54] CASING OF A MAGNETIC RECORDING AND REPRODUCING APPARATUS HAVING RAILS FOR DETACHABLE MOUNTING TO A COMPUTER

[75] Inventors: Makoto Kuwamoto, Hirakata; Michiro Tanaka, Ikoma; Hiroshi Kohso, Fujiidera; Yuji Yagi, Neyagawa, all of Japan

[73] Assignee: Matsushita Electric Industrial Co., Ltd., Osaka-fu, Japan

[21] Appl. No.: 975,631

[22] Filed: Nov. 13, 1992

[30] Foreign Application Priority Data

Nov. 14, 1991 [JP] Japan ................................. 3-298724

[51] Int. Cl.$^6$ ............................................... G11B 17/02
[52] U.S. Cl. ..................................................... 360/97.01
[58] Field of Search ............................ 360/97.01, 97.02, 360/97.03, 97.04; 361/395, 685

[56] References Cited

U.S. PATENT DOCUMENTS

| | | | |
|---|---|---|---|
| 4,194,225 | 3/1980 | Hasler | 360/97.02 |
| 4,317,146 | 2/1982 | Gervais | 360/98 |
| 4,923,406 | 5/1990 | Bucknam | 439/77 |
| 4,965,684 | 10/1990 | Stefansky | 360/78.12 |
| 5,025,335 | 6/1991 | Stefansky | 360/97.01 |
| 5,155,662 | 10/1992 | I-Shou | 361/392 |
| 5,195,022 | 3/1993 | Hoppal et al. | 361/391 |

FOREIGN PATENT DOCUMENTS

| | | |
|---|---|---|
| 0 427 490 | 5/1991 | European Pat. Off. . |
| 37 13 321 | 10/1987 | Germany . |
| 91/02349 | 2/1991 | WIPO . |

OTHER PUBLICATIONS

"Low Power", Leibson, EDN, Sep. 16, 1991, vol. 36, No. 19 p. 99 (360/903).

Maury Wright, "High–Capacity 3 1/2–in. Hard–Disk Drives", *EDN Electrical Design News*, vol. 36, No. 3, Feb. 1991, p. 80.

*Primary Examiner*—Robert S. Tupper
*Attorney, Agent, or Firm*—Wenderoth, Lind & Ponack

[57] ABSTRACT

A magnetic recording and reproducing apparatus comprising: a magnetic recording and reproducing medium; a spindle motor for effecting rotational drive of the magnetic recording and reproducing medium; a transducer for recording and reproducing information on one face of the magnetic recording and reproducing medium; a displacement member for displacing the transducer to an arbitrary radial position on the face of the magnetic recording and reproducing medium; an electric circuit board for processing the information and controlling the spindle motor and the displacement member; and a casing in which the magnetic recording and reproducing medium, the spindle motor, the transducer, the displacement member and the electric circuit board are mounted; the casing having a bottom wall such that a boxlike space is defined below the bottom wall; the electric circuit board being disposed in the boxlike space.

1 Claim, 4 Drawing Sheets

CASING OF A MAGNETIC RECORDING AND REPRODUCING APPARATUS HAVING RAILS FOR DETACHABLE MOUNTING TO A COMPUTER

BACKGROUND OF THE INVENTION

The present invention relates to a magnetic recording and reproducing apparatus used as an external storage of a computer, which has a sufficient strength and can be detachably mounted on a computer body.

In recent years, the storage capacity of magnetic recording and reproducing apparatuses used as external storages of portable computers has been improved remarkably. In response to trends towards more compact and lighter portable computers, lighter and more compact magnetic recording and reproducing apparatuses which can be detachably mounted on a computer body are in demand. As described in, for example, U.S. Pat. No. 5,025,335, a magnetic recording and reproducing apparatus incorporated in a computer body of especially, a so-called notebook-sized computer is as thin as less than 20 mm.

Conventionally, when a casing of the magnetic recording and reproducing apparatus is mounted on a computer body, a mounting portion of the computer body is so formed as to be elastic or shock-absorbing rubber is used on the casing in Order to not only eliminate positional error between a mounting face of the computer body and a fixing portion of the magnetic recording and reproducing apparatus but minimize strain of the casing. Since disturbances such as vibrations, impacts, etc. are prevented from being transferred to the magnetic recording and reproducing apparatus to some extent by such procedures, the quantity of the disturbances applied to the magnetic recording and reproducing apparatus is not so large.

However, the magnetic recording and reproducing apparatus is secured in the computer body. Therefore, even if data has been recorded on the magnetic recording and reproducing apparatus up to its full storage capacity, a user cannot replace the magnetic recording and reproducing apparatus with a new one by himself.

On the other hand, in response to the popularity of portable computers, a need for compact, e.g., 2.5", fixed storages is growing. However, since the storage capacity of such compact fixed storages is small, a demand has arisen that the compact fixed storages be replaceable. When the fixed storage is detachably mounted on a computer body, the magnitude of disturbances such as vibrations, impacts, etc. applied to the fixed storage during its nonoperative state is far larger than that of the fixed storage secured in the computer body. When an extremely large impact is applied to the fixed storage during its nonoperative state, a strain is produced in a casing of the fixed storage, thereby constituting an obstacle to high-density magnetic recording.

SUMMARY OF THE INVENTION

Accordingly, an essential object of the present invention is to provide a magnetic recording and reproducing apparatus which not only exhibits high strength despite being compact and thin but can be handled easily.

In order to accomplish this object of the present invention, a magnetic recording and reproducing apparatus according to the present invention comprises: a magnetic recording and reproducing medium; a spindle motor for effecting rotational drive of the magnetic recording and reproducing medium; a transducer for recording and reproducing information on one face of the magnetic recording and reproducing medium; a displacement means for displacing the transducer radially along the face of the magnetic recording and reproducing medium; an electric circuit board for processing the information and controlling the spindle motor and the displacement means; a casing in which the magnetic recording and reproducing medium, the spindle motor, the transducer, the displacement means and the electric circuit board are mounted; the casing having a bottom wall and defining a boxlike space below the bottom wall; the electric circuit board being disposed in the boxlike space; and a cover for closing the electric circuit board within the casing.

According to the first embodiment of the present invention, since the boxlike space is provided below the bottom wall of the casing and the electric circuit board is disposed in the boxlike space, the section modulus of the casing is comparatively high whereby the strength of the apparatus is high and the electric circuit board can be protected from damage by the cover.

Further, the casing includes a pair of rails formed at opposite sides of the casing, respectively and a connector is provided at one end of the rails. The rails are provided at a lower end of the casing and have a thickness of not more than 3.3 mm such that a groove having a depth of not less than 3 mm is defined above each of the rails.

Because each of the rails is provided at the lower end of each of the opposite sides of the casing, the apparatus can be mounted on and detached from the computer body by the operator himself.

BRIEF DESCRIPTION OF THE DRAWINGS

This object and features of the present invention will become more apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
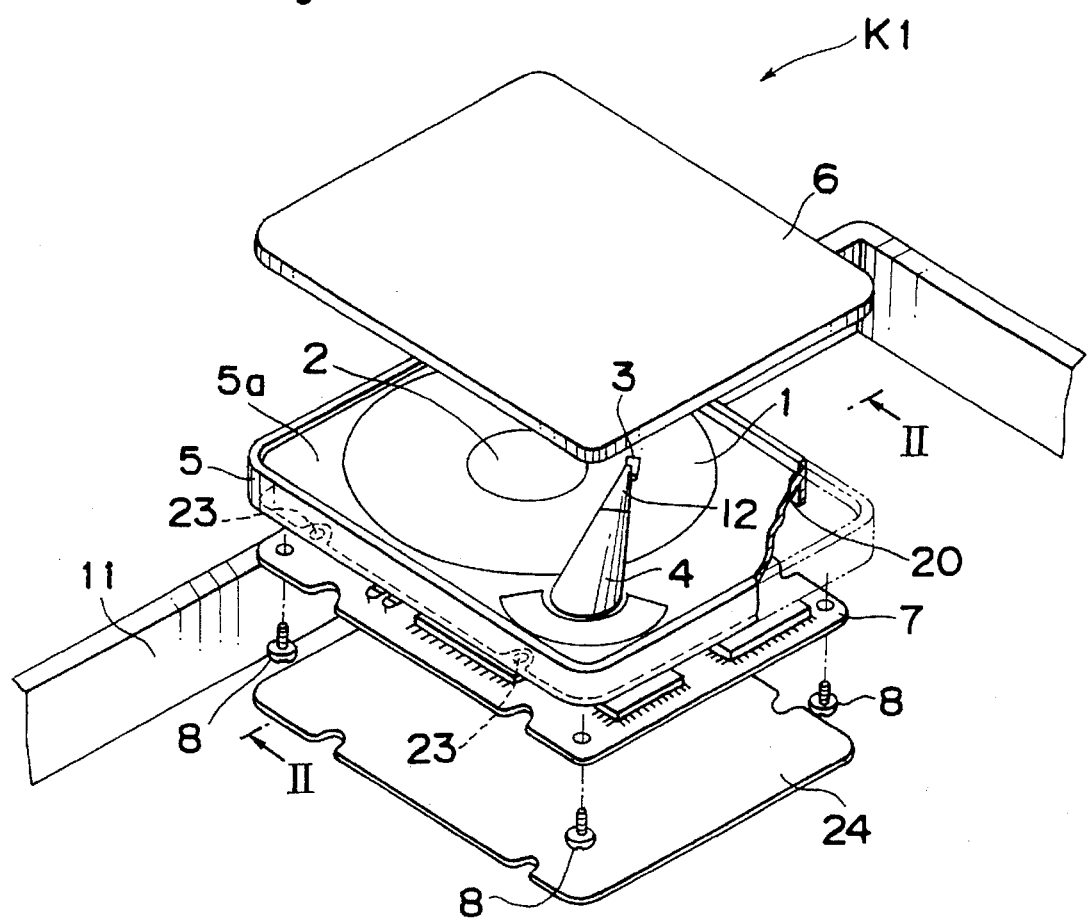
FIG. 1 is a perspective view of a first embodiment of a magnetic recording and reproducing apparatus according to the present invention.
Figure 2:
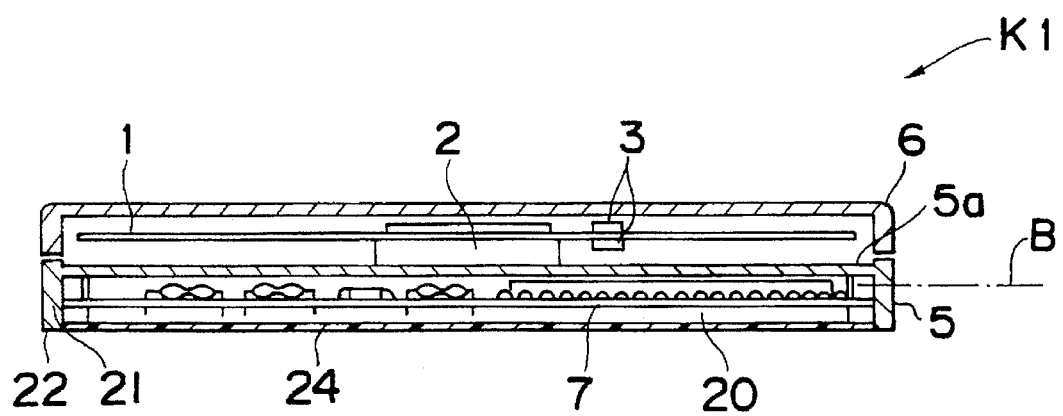
FIG. 2 is a sectional view taken along the line II—II in FIG. 1.

Referring now to the drawings, there is shown in FIGS. 1 and 2, a magnetic recording and reproducing apparatus K1 according to a first embodiment of the present invention. The apparatus K1 includes at least one magnetic recording and reproducing medium 1 having a diameter of about 48 mm, a spindle motor 2 for effecting rotational drive of the medium 1 and a transducer 3 which is provided on one of opposite faces of the medium 1. At least one medium 1 is mounted on the spindle motor 2. Thus, when one medium 1 is used, two transducers 3 should be provided. Meanwhile, when two media 2 are used, four transducers 3 should be provided.

The apparatus K1 further includes a displacement means 4, a boxlike casing 5 and a first cover 6. The displacement means 4 is provided for displacing the transducer 3 to an arbitrary position on one face of the medium 1 so as to record and reproduce information on the medium 1. The spindle motor 2 and the displacement means 4 are mounted on a bottom wall 5a of the casing 5 so as to be closed by the first cover 6.

Moreover, the apparatus K1 includes an electric circuit board 7 and a second cover 24. In the casing 5, a boxlike space 20 is defined below the bottom wall 5a. The electric circuit board 7 is fitted in the boxlike space 20 so as to be attached to the casing 5 by screws 8 and is closed by the second cover 24. The apparatus K1 is secured to a computer body 11 by using tapped holes 23 formed on a bottom face 22 of a side wall 21 of the casing 5.

The operation of the apparatus K1 will now be described with reference to FIGS. 1 and 2. The spindle motor 2 is usually rotated at a constant speed of about 3,600 r.p.m. so as to drive the medium 1, i.e. rotate the medium. The transducer 3 is attached to a distal end of the displacement means 4 via a flexible support member 12 and is usually caused to hover above the face of the medium 1 through a gap of about 0.1 μm by an air flow produced by the rotation of the medium 1. Therefore, air in the casing 5 is required to be kept clean. To this end, the first cover 6 closes the casing 5 so as to prevent outside minute particle of dust from entering the casing 5. The transducer 3 is positioned at an arbitrary location of a data region of the medium 1 while hovering above the face of the medium 1 such that information is exchanged between the transducer 3 and the medium 1.

In the first embodiment of the present invention, since the section modulus about a neutral axis B (FIG. 2) of the casing 5 is constituted by the side wall 21 defining the boxlike space 20 below the bottom wall 5a, the mechanical strength of the casing 5 is fairly high. Thus, when the electric circuit board 7 is attached to the casing 5 or the apparatus K1 is mounted on the computer body 11, strain of the casing 5 is correspondingly. Meanwhile, contact with the electric circuit board 7 from the outside is prevented by the side wall 21 and the second cover 24.

As described above, the boxlike space 20 is defined below the bottom wall 5a of the casing 5 and the electric circuit board 7 is mounted in the boxlike space 20 so as to be closed by the second cover 24. Therefore, in accordance with the first embodiment of the present invention, the casing 5 can exhibit high strength even though the apparatus K1 is thin, and the electric circuit board 7 can be protected.

Figure 3:
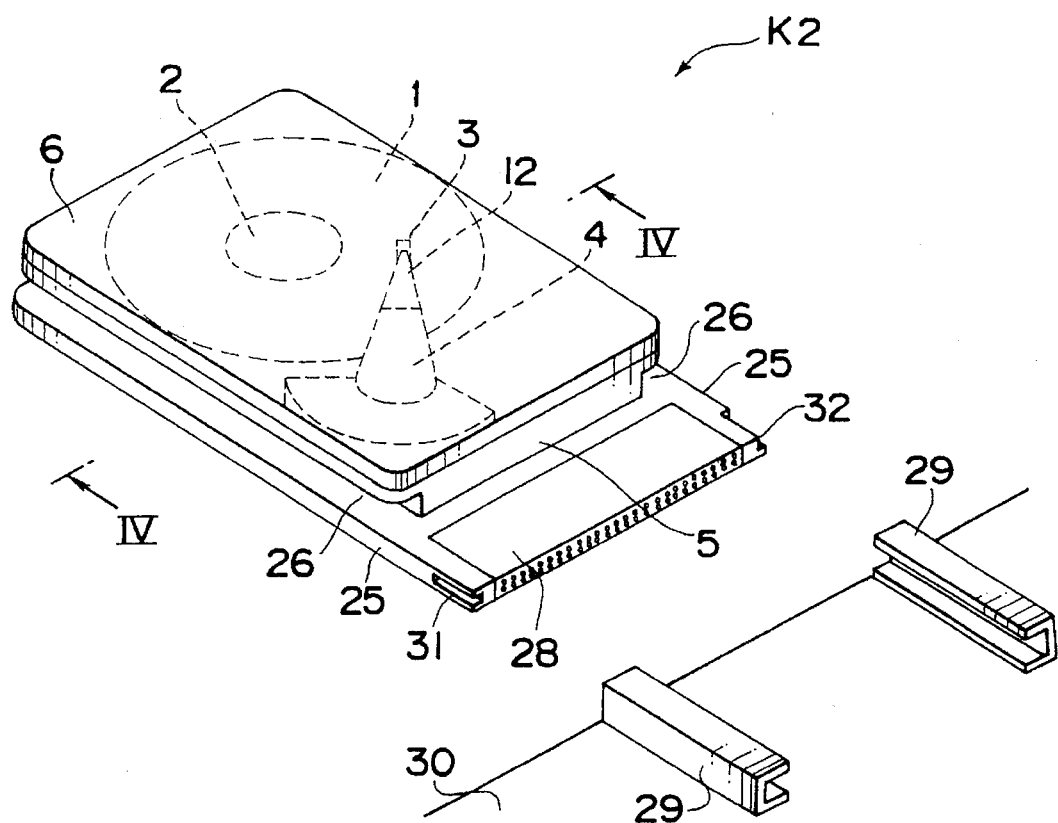
FIG. 3 is a perspective view of a second embodiment of a magnetic recording and reproducing apparatus according to the present invention.
Figure 4:
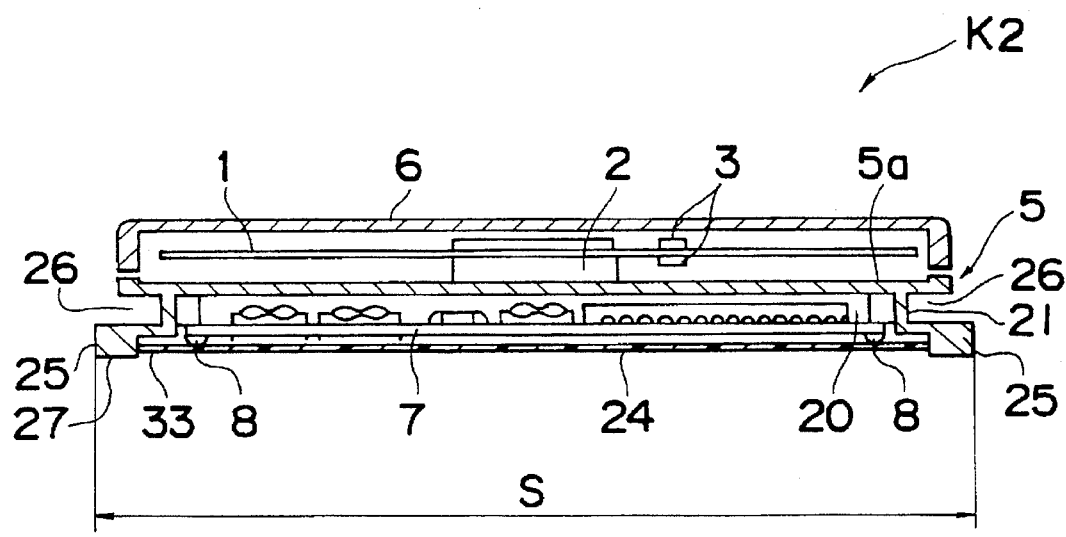
FIG. 4 is a sectional view taken along line IV—IV in FIG. 3.

Referring further to FIGS. 3 and 4, a second embodiment a magnetic recording and reproducing apparatus K2 according to the present invention will be described. In the casing 5, each of a pair of rails 25 is formed at a lower end of each of opposite longitudinal side faces of the side wall 21 so as to project laterally outwardly from the side wall 21. A groove 26 is defined between the bottom wall 5a and each of the rails 25. The groove 26 has a width of about 1 to 2 mm and a depth of about 3 mm. The rails 25 define a lower end face 27 of the casing 5 and have a height of about 3.3 mm from the lower end face 27. Further, a connector 28 is provided at one end of the rails 25 so as to be flush with the rails 25. The rails 25 are longer than the first cover 6. At one end of the rails 25 adjacent to the connector 28, one of the rails 25 is formed with a cavity 31 having a proper length, while the other of the rails 25 is formed with a recess 32 having a proper length. When the second cover 24 has been attached to the casing 5, the second cover 24 is disposed slightly above the lower end face 27 of the rails 25 such that a recessed portion 33 is formed between the second cover 24 and the lower end face 27 of the rails 25. A pair of guides 29 each having a substantially U-shaped cross section are provided on a computer body 30 so as to receive the rails 25, respectively. As a result, when the apparatus K1 is mounted on and detached from the computer body 30 through an engagement of the rails 25 with the guides 29 and a disengagement of the rails 25 from the guides 29, the second cover 24 is held out of contact with the guides 29. Since the remaining structure of the apparatus K2 is similar to that of the apparatus K1, a description thereof is abbreviated for the sake of brevity.

The apparatus K2 is operated in the same manner as the apparatus K1. The apparatus K2 is characterized in that not only does the casing 5 exhibit high strength but the apparatus K2 can be mounted on and detached from the computer body 30 by the operator himself. When the apparatus K2 is mounted on and detached from the computer body 30, the position of the apparatus K2 in directions of height and width of the casing 5 is regulated by the engagement of the rails 25 with the guides 29.

Meanwhile, in the apparatus K2, the rails 25 are provided along the lower end face 27 of the casing 5. However, in order to secure a high strength for the casing 5, the rails 25 may not necessarily be provided along the lower end face 27 of the casing 5.

When the rails 25 have a thickness of 3.3 mm and a span S of about 54 mm and the groove 26 has a width of 1 to 2 mm and a depth of 3 mm or more, the apparatus K2 can be used, without modification, for a mechanism for detachably mounting an IC (integrated circuit) memory card. In this case, the diameter of the medium 1 is not more than 50 mm.

In the second embodiment of the present invention, the electric circuit board is mounted in the boxlike space defined below the bottom wall of the casing, a pair of rails are, respectively, provided at opposite side of the casing and, that the connector is provided at one end of the rails. Therefore, the apparatus can be mounted on and detached from the computer body by the operator himself. In addition, since the casing also retains a high strength, the apparatus can withstand external forces or impacts applied thereto when the operator is carrying the apparatus.

What is claimed is:

1. A magnetic recording and reproducing apparatus comprising:

a magnetic recording and reproducing medium;

a spindle motor which rotates said magnetic recording and reproducing medium;

a transducer which records and reproduces information on one surface of said magnetic recording and reproducing medium;

a displacement mechanism which displaces said transducer radially along said one surface of said magnetic recording and reproducing medium;

a casing including a bottom wall, a side wall extending around said bottom wall, and a pair of rails unitary with said side wall and said bottom wall for guiding the casing into and out of a computer body and imparting strength to the casing, said rails extending longitudinally at opposite sides of the casing, respectively, said spindle motor and said displacement mechanism being mounted to said casing on one side of said bottom wall, and said side wall protruding from said bottom wall to define a box-like space to the other side of said bottom wall, wherein said rails, said bottom wall and said side wall of said casing are of one piece;

a first cover closing said magnetic recording and reproducing medium, said spindle motor, said transducer and said displacement mechanism within said casing;

an electric circuit board, which processes information and controls said spindle motor and said displacement mechanism, mounted to said casing in the box-like space defined thereby;

a second cover closing said electric circuit board within said box-like space; and an electrical connector disposed at one end of said rails.

* * * * *